United States Patent
Federle et al.

(10) Patent No.: US 11,584,291 B2
(45) Date of Patent: Feb. 21, 2023

(54) DEVICE AND METHOD OF COMMUNICATING

(71) Applicant: Valeo North America, Inc., Troy, MI (US)

(72) Inventors: Clifford Federle, Seymour, IN (US); Monji Moumen, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 609 days.

(21) Appl. No.: 16/727,054

(22) Filed: Dec. 26, 2019

(65) Prior Publication Data

US 2021/0197706 A1 Jul. 1, 2021

(51) Int. Cl.
| | |
|---|---|
| *F21S 45/60* | (2018.01) |
| *B60S 1/56* | (2006.01) |
| *H05B 3/84* | (2006.01) |
| *B60Q 1/00* | (2006.01) |
| *B60S 1/60* | (2006.01) |
| *H05B 1/02* | (2006.01) |

(52) U.S. Cl.
CPC ......... *B60Q 1/0005* (2013.01); *B60Q 1/0017* (2013.01); *B60S 1/603* (2013.01); *F21S 45/60* (2018.01); *H05B 1/0236* (2013.01); *H05B 3/84* (2013.01)

(58) Field of Classification Search
None
See application file for complete search history.

(56) References Cited

U.S. PATENT DOCUMENTS

| | | | | |
|---|---|---|---|---|
| 8,899,803 | B2* | 12/2014 | Marley | F21S 41/143 |
| | | | | 362/516 |
| 9,865,158 | B2 | 1/2018 | Kang et al. | |
| 10,325,484 | B2 | 6/2019 | Saintellemy et al. | |
| 2016/0215952 | A1* | 7/2016 | Dunn | F21S 41/151 |
| 2018/0184499 | A1 | 6/2018 | Wu | |
| 2018/0306401 | A1* | 10/2018 | Robinson | F21S 41/663 |
| 2019/0202373 | A1* | 7/2019 | Kubota | B60S 1/026 |
| 2020/0307455 | A1* | 10/2020 | Liu | B60R 1/0602 |
| 2020/0314311 | A1* | 10/2020 | Liu | G02B 7/028 |
| 2020/0391576 | A1* | 12/2020 | Ostrowski | H05B 1/0236 |
| 2021/0339709 | A1* | 11/2021 | Conway | B60H 1/00785 |
| 2021/0347319 | A1* | 11/2021 | Williams | B60R 3/00 |
| 2022/0063371 | A1* | 3/2022 | Michalowski | F21S 41/28 |
| 2022/0234519 | A1* | 7/2022 | Hirotani | B60R 13/005 |

FOREIGN PATENT DOCUMENTS

CN 108765893 A 11/2018

* cited by examiner

*Primary Examiner* — Joseph M. Pelham
(74) *Attorney, Agent, or Firm* — Young Basile Hanlon & MacFarlane, P.C.

(57) ABSTRACT

A method comprising: (a) heating a light module of a vehicle with a heater; (b) monitoring a temperature of the light module; (c) activating a communication sequence; and (d) performing the communication sequence so that a message is conveyed between a controller of the light module and a controller of the vehicle.

20 Claims, 2 Drawing Sheets

DEVICE AND METHOD OF COMMUNICATING

FIELD

The present teachings relate a device and method of communicating a message between two devices and more specifically a device and method of detecting a false alarm when a device is turned off and specifically a shutdown pattern that indicates a device is being intentionally shutdown.

BACKGROUND

In cold environments headlamps may become covered in ice and/or snow causing a diminished amount of light to shine through the headlamp, thus, causing reduced visibility for a driver. Heaters have been added to the headlamps to remove the ice and/or snow. A secondary controller may turn off the heater which may send a fault notice to a vehicle causing an alarm to be triggered.

Examples of fault alarms may be disclosed in U.S. Pat. Nos. 10,325,484 and 9,865,158; US Publication No. 2018/0184499; and Chinese Patent No. CN108765893 all of which are expressly incorporated herein by reference for all purposes. Thus, there is a need for a device that communicates with the vehicle to convey a message. There is a need for a device that indirectly communicates with the vehicle. The device may communicate with the vehicle to indicate that a normal shutdown has occurred and not a fault. It would be desirable to have a process of shutting down that indicates to the vehicle that an intentional shutdown has occurred. There is a need for a pattern of shutting down that indicates a fault has not occurred without a use of a separate signal wire.

SUMMARY

The present teachings provide: a method comprising: (a) heating a light module of a vehicle with a heater; (b) monitoring a temperature of the light module; (c) activating a communication sequence; and (d) performing the communication sequence so that a message is conveyed between a controller of the light module and a controller of the vehicle.

The present teachings provide: A light system comprising: (a) a light module, (b) a heater configured to heat the light module so that when ice, snow, or both are located on the light module the heater melts the snow and ice; (c) a sensor that monitors a temperature of the light module; (d) a switch that turns the heater on and off; and (e) a controller that turns the switch on when snow, ice, or both are detected or an occupant of a vehicle turns the heater on, and transmits to a communication to a controller of the vehicle by performing a communication sequence.

The present teachings provide a device that communicates with the vehicle to convey a message. The present teachings provide a device that indirectly communicates with the vehicle. The present teachings provide a device may communicate with the vehicle to indicate that a normal shutdown has occurred and not a fault. The present teachings provide a process of shutting down that indicates to the vehicle that an intentional shutdown has occurred. There is a need for a pattern of shutting down that indicates a fault has not occurred without a use of a separate signal wire.

DETAILED DESCRIPTION

Figure 1:
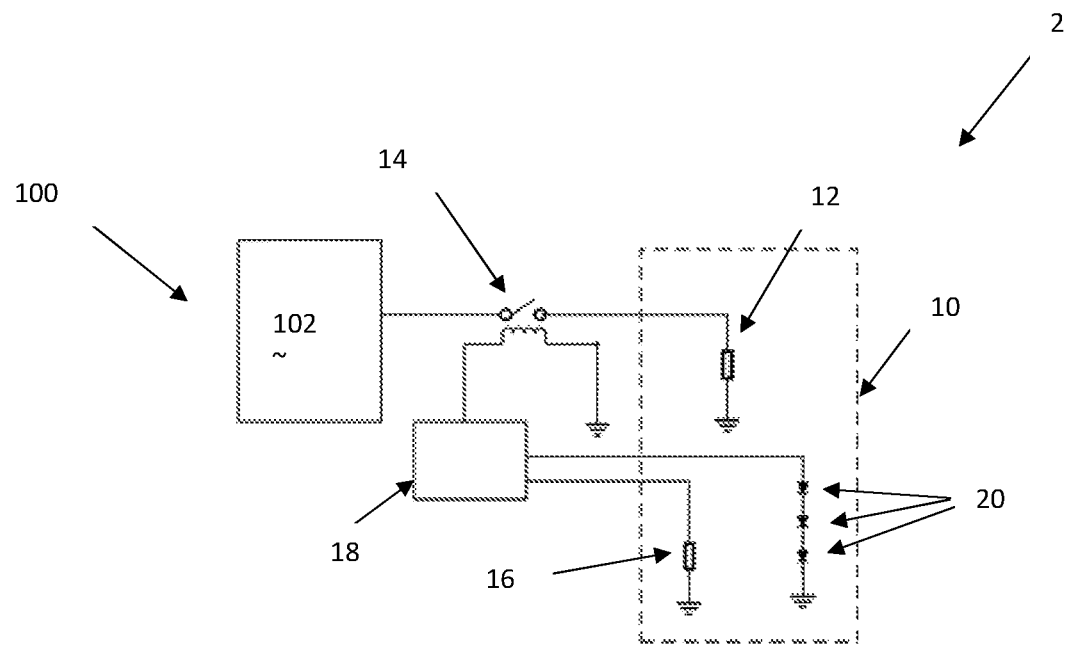
FIG. 1 is a schematic of the light system and vehicle.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. However, the present system may be provided in any device that is in direct or indirect communication with another device. The devices may be in communication by one device monitoring a current draw of a second device. Preferably, the device is a light system including at least a light module and a heater. The light system is located with a vehicle. Preferably, the light system is part of a car, motorcycle, bus, truck, semi-truck, SUV, XUV, four-wheeler, dirt bike, or a combination thereof. The light system may project in a forward direction, rear direction, side direction, or a combination thereof. Preferably, the light system projects a light from an external surface of the vehicle to a location in front of the vehicle. The light system may be integrated into a front end, a rear end, or both of a car. The light system may project light out of the vehicle. The light source may include lights and optical elements. The lights of the light system may be part of a light source. The lighting system, the light source, or both may produce heat; however, in the winter there may be instances where the lighting system, the light source, or both may not fully melt snow or ice that collect on the light module of the lighting system so that light exiting the light module may be fully or partially obstructed.

The light module may function to house all or a portion of a light source so that the light source is protected, the light source may be directed out of the light module, or both. The light module may include a transparent cover. The light module may be inserted into a portion of the vehicle. The light module may house the light source. The light module may be connected to the vehicle once the light module is inserted into a cavity in the vehicle. The light module may be a headlight, and the headlight may include the light sensor. The light module may include or be connected to a heater, switch, sensor, controller, a signal wire, or a combination thereof.

The heater functions to heat the light module, a transparent cover of the light module, or both. The heater may extend along virtually any part of the cover. The heater may extend around a periphery of the cover. The heater may be a non-contact heater (e.g., heat via convection) or a contact heater (e.g., conduction). The heater may extend along or around all or a portion of a periphery of a light module, a cover of the light module, or both. The heater may be internal. The heater may be a thermoelectric device, a resistive wire, an infrared heater, or a combination thereof. The heater may heat to a temperature that is sufficient to melt snow, ice, or both. The heater may heat to a temperature that is less than a melting point or glass transition temperature of the materials used to construct the light module. The heater may heat to a temperature of about 25 C or more, about 50 C or more, about 75 C or more, or about 100 C or less. The heater may be connected to or in communication with one or more switches, one or more sensors, one or more controllers, or a combination thereof.

The one or more switches may function to turn on, turn off, or vary current (or voltage) applied to the heater. The one or more switches may be switched to partially on, partially off, fully on, fully off, or a combination thereof. Preferably, the one or more switches may be fully on or fully off. The switch may interrupt a power or current supply when the switch is in the off position. The switch may allow current or power to pass when the switch is in the on position. The switch may be a mechanical switch. The switch may be an electronic switch. The switch may be or include a transistor, a vacuum tube, a metal-oxide-semiconductor field-effect transistor (MOSFET), a temperature switch, a thermal expansion switch, or a combination thereof. The one or more switches may be in communication with one or more sensors.

The one or more sensors may function to monitor a temperature of a heater, the state of the switch, or both. The one or more sensors may monitor a temperature of the light module, a cover of the light module, a temperature of the light source, or a combination thereof. The one or more sensors may prevent the light module from overheating. The sensor may sense when current is first applied and start a timer to turn off the heater. Preferably, the sensor only monitors temperature. The sensor may be a thermistor, negative temperature coefficient sensor, positive temperature coefficient sensor thermocouple, radiance temperature detector, thermocouple, a semiconductor based sensor, a contact temperature sensor, a non-contact temperature sensor, a bi-metallic sensor, infrared temperature sensor, or a combination thereof. The sensor may measure an internal temperature of the light module. The sensor may measure an external temperature of the light module. The sensor may measure a temperature of the cover of the light module. The measured temperature of the sensor may be transmitted to the controller.

The controller functions to control the heater, the sensor, a switch, the light module, a light source, or a combination thereof. Preferably, the controller controls the heater by controlling the switch. The controller may be a secondary controller. The controller may be a slave controller to a primary controller (e.g., a controller of the vehicle). The controller may control some aspects of the light module but when a message or signal is sent by the controller of the vehicle, the signal from the controller may be subordinated. A primary controller may control the functions of a larger device that houses or includes the device taught herein. For example, the primary controller may control the vehicle and the secondary controller may control certain aspects of the light module. However, if the device and method taught herein are incorporated into another article then the primary controller may controller the larger device (e.g., a pump) and the secondary controller may control a motor or device within the larger device. The controller may turn the switch on. The controller may turn the switch off. The controller may turn the switch on when a request from a user, a vehicle controller (e.g., body control module (BCM)), or both. The controller may be in communication with both the sensor and the switch. The vehicle controller may function to turn on the heater and the controller may function to turn off the heater. The controller may receive signals from the sensor and based upon the signals from the sensor may keep the heater running or turn the heater off. The controller may be programmed to turn off the heater when a temperature of the heater, the light module, or both is achieved. The controller may turn off the heater when an ambient temperature raises above a predetermined temperature. The controller may monitor a temperature reading from the sensor and turn off the heater once a maximum temperature or predetermined maximum temperature is measured. The controller may be in directed communication with the vehicle controller (e.g., through a signal wire). The controller and vehicle controller may be free of any communication. The controller and vehicle controller may indirectly communicate (e.g., may communicate through other components or measurements). The controller may perform or activate a communication sequence once a predetermined temperature or condition is achieved.

The communication sequence may function to provide a message between a primary controller and a secondary controller. Preferably, the communication sequence may function to indicate that a heater is turned off or will be turned off. The communication sequence may indicate that power is reduced, a fault with another device has occurred, there is an interruption, power or current has been turned off, or a combination thereof. The communication sequence could be non-electrical and may be providing pressure interruption in a hydraulic line. For example, the pressure may be increased and decreased to convey a message. The communication sequence may be formed to create words, sentences, or complete messages. For example, the sequence may be performed as Morse code or a hexadecimal code such as an ASCII table. The communication sequence may be created by adjusting an amount of current or power provided. The communication sequence may have a partial on phase. In the partial on phase the power may be less than 100 percent and greater than 0 percent. The communication sequence may be provided by varying power. For example, power may be decreased by 20 percent for a predetermined period of time to convey one message and by 40 percent to convey a different message. When the decrease in temperature is recognized the message associated with that decrease in power or current is conveyed between the secondary controller and the primary controller. The current or power supplied during a communication sequence may be any amount between 0 percent and 100 percent. Preferably, the amount of power or current supplied may be 100 percent and 0 percent. However, during a communication sequence the amount of power or current supplied may be less than 100 percent and greater than 0 percent. The amount of power or current may be varied by increments of 5 percent or more, 10 percent or more, 15 percent or more, 20 percent or more, or about 25 percent or less. The amount of power or current may be varied by about 50 percent or less, about 40 percent or less, or about 30 percent or less. The predetermined increments may be 20 percent, 40 percent, 60 percent, 80 percent, 100 percent or a combination thereof. The increments may be controlled using pulse width modulation. The communication sequence may vary in length and number depending upon the message being relayed. The communication sequence may permit a primary controller and secondary controller to speak or convey a message without being directly connected. The communication sequence may be a shutdown sequence.

The shutdown sequence functions to indicate that the heater is not broken and is being turned off. The shutdown sequence may be turning the heater on and off one or more times. The shutdown sequence may be temporarily stopping current to the heater. The shutdown sequence may be reducing current to the heater. The shutdown may have an on phase and an off phase. The on phase may be performed one or more times, two or more times, or three or more times. The off phase may be performed one or more times, two or more times, or three or more times. The on phase and the off phase may be created via pulse width modulation to indicate a shutdown. The pulse width modulation may create a high level of on phases, off phases, or both in a short period of time (e.g., 10 or more, 20 or more, or 50 or more phase changes in a few seconds). The shutdown sequence may be performed one or more times, two or more times, or three or more times before the heater is finally turned off. The on phase, the off phase, or both may have a duration of about 1 second or more, 2 seconds or more, 3 seconds or more, or 5 five seconds or more. The on phase, the off phase, or both may have a duration of about 20 seconds or less, about 15 seconds or less, or about 10 seconds or less. For example, during a shutdown sequence the current may be turned off for 5 seconds, then turned on for 5 seconds, and then finally turned off. The on phase may be created by opening a switch. The off phase may be created by closing a switch. The shutdown sequence may cut all of the current. The shutdown sequence may cut some of the power or reduce the current sent to the heater. The shutdown sequence may be used when no signal wire is present between the vehicle controller and the controller. The shutdown sequence may be used when a signal wire is present between the vehicle controller and the controller.

The signal wire may function to provide communication between the controller and the vehicle controller. The signal wire may indicate that a shutdown is about to occur. The signal wire may provide a signal to the vehicle controller so that the vehicle controller shuts down the heater. The light module may be free of a signal wire.

The light module may be controlled via a process. The process steps may be performed in virtually any order. The light module may be heated with a heater. A temperature of the headlight or light module may be monitored. A sensor may monitor the temperature or monitor for a maximum temperature. A signal may be transmitted from the sensor to a controller. The controller may activate a shutdown sequence. The controller may control a switch. The controller may close the switch, open the switch, or both. The controller may open or close the switch one or more times, two or more times, or three or more times. The switch may remain open or closed for a duration of time. The duration of time may be measured in milli seconds. The duration of time may be greater than a second. A signal may be transmitted from a controller to a vehicle controller directly or indirectly. The signal may be transmitted to the vehicle controller by performing a shutdown sequence.

FIG. 1 is a schematic of the light system 2 within a vehicle 100. The vehicle 100 includes a vehicle controller 102 (e.g., primary controller). The light system 2 includes a light module 10 in communication with a controller 18 (e.g., a secondary controller) and a switch 14. The light module 10 includes a plurality of lights 20, a heater 12 to prevent snow and ice from building up on the light module 10, and a sensor 16 to monitor the temperature of the heater 20. The switch 14 controls power or current supplied to the heater 12. The controller 18 is connected to the sensor 16 so that when a predetermined temperature is achieved the controller 18 sends a signal to the switch 14 to change a position of the switch 14. The controller 18 also controls the lights 20.

Figure 2:
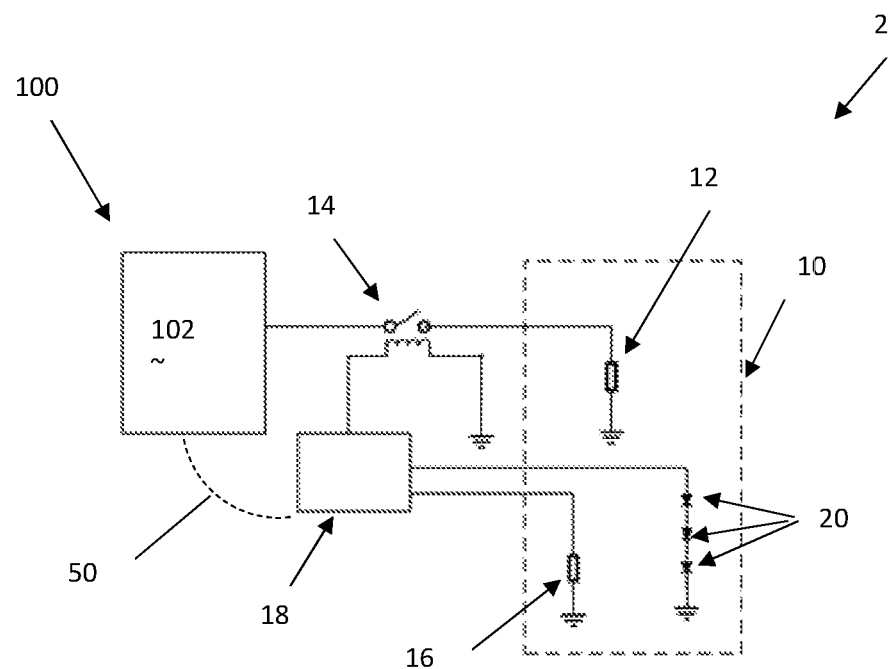
FIG. 2 is a schematic view of the light system and vehicle including a signal wire.

FIG. 2 is a schematic of the light system 2 within a vehicle 100. The vehicle 100 includes a vehicle controller 102 (e.g., primary controller). The light system 2 includes a light module 10 in communication with a controller 18 (e.g., a secondary controller) and a switch 14. The light module 10 includes a plurality of lights 20, a heater 12 to prevent snow and ice from building up on the light module 10, and a sensor 16 to monitor the temperature of the heater 20. The switch 14 controls power or current supplied to the heater 12. The controller 18 is connected to the sensor 16 so that when a predetermined temperature is achieved the controller 18 sends a signal to the switch 14 to change a position of the switch 14. The controller 18 also controls the lights 20. A signal wire 50 extends between the controller 18 and the vehicle controller 102 so that the controller 18 and the vehicle controller 102 can directly communicate.

Figure 3:
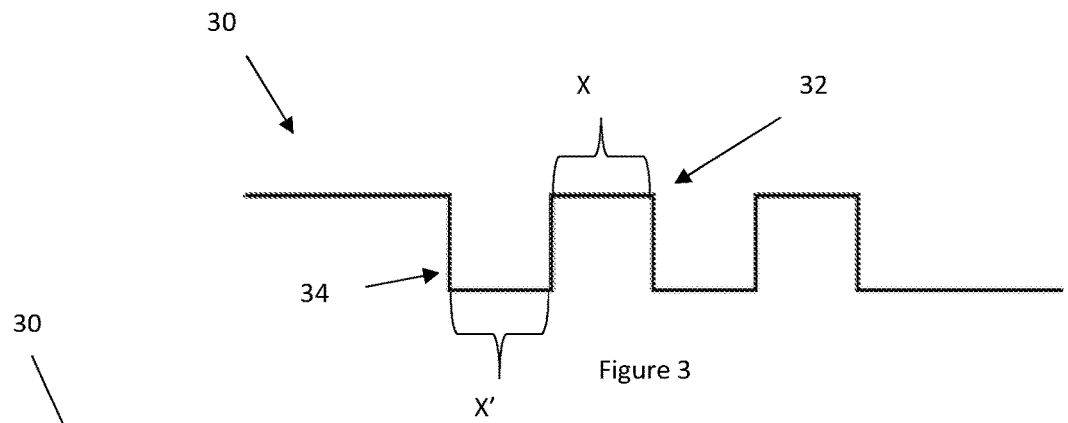
FIG. 3 is a communication sequence.

FIG. 3 illustrates a current draw during a communication sequence 30. The communication sequence includes on phases 32 having a length (X) and off phases having a length (X').

Figure 4:
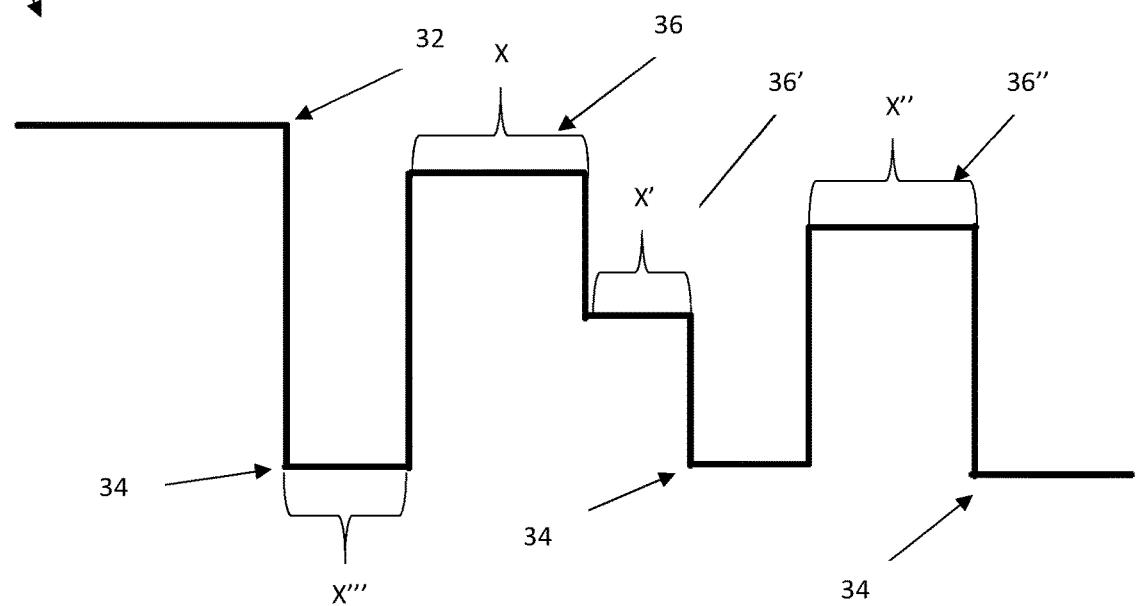
FIG. 4 is a communication sequence with a partial on phase.

FIG. 4 illustrates a communication sequence 30. The communication sequence 30 begins at an on phase 32 then goes to an off phase 34 having a length (X'''). From the off phase 34 the communication sequence changes to a partial on 36 with a length (X) and then a smaller partial on 36' with a length (X') and terminating at an off phase 34. From the second off phase 34 another partial on 36'' have a length (X'') is created that has a current draw between the partial on 36 and the partial on 36'. From the partial on 36'' the current is changed to an off phase 34.

Figure 5:
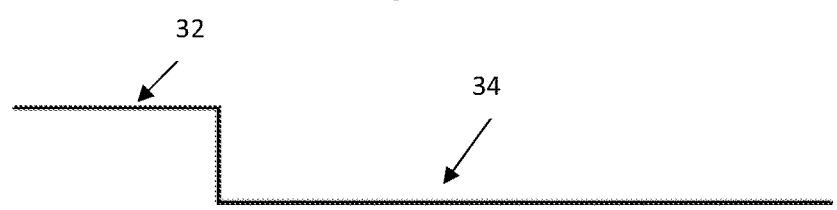
FIG. 5 is a heater failure.

FIG. 5 is a heater failure where the current goes directly from an on phase 32 to an off phase 34.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Light System
10 Light Module
12 Heater
14 Switch
16 Sensor
18 Controller
20 Lights
30 Current Draw During Communication Sequence
32 On phase
34 Off Phase
36 Partial On
40 Current Draw of Heater Break
42 Current Draw of Heater Fail
50 Signal Wire
100 Vehicle
102 Primary Controller

We claim:

1. A method comprising:
 a. heating a light module of a vehicle with a heater;
 b. monitoring a temperature of the light module;
 c. activating a communication sequence; and
 d. performing the communication sequence so that a message is conveyed between a controller of the light module and a controller of the vehicle;
 wherein the communication sequence indicates that the heater is being or will be turned off.

2. The method of claim 1, wherein the communication sequence has an off phase where the current provided is turned off one or more times and an on phase wherein the current provided is turned on one or more times.

3. The method of claim 2, wherein the communication sequence is a shutdown sequence that performs the off phase two or more times and the on phase two or more times before finally turning the heater off.

4. The method of claim 2, wherein the current is turned off for three seconds or more in the on phase and then turned on for three seconds or more in the on phase.

5. The method of claim 3, wherein the current is turned off for ten seconds or less in the off phase and is turned on for ten seconds or less in the on phase.

6. The method of claim 1, wherein an amount of power or current supplied to a heater is varied during the communication sequence.

7. The method of claim 6, wherein the amount of power or current supplied is less than 100 percent and is greater than 0 percent during the communication sequence.

8. The method of claim 1, wherein the heater is a positive temperature coefficient heater or a resistive heater.

9. The method of claim 1, wherein the temperature is monitored with a sensor.

10. The method of claim 9, wherein the sensor is a negative temperature coefficient sensor or a thermistor.

11. The method of claim 6, wherein the step of activating a shutdown sequence includes opening and closing a switch one or more times.

12. The method of claim 1, wherein the heater is free of a connection with a signal wire.

13. The method of claim 1, wherein the controller of the vehicle is free of connection with a signal wire from the heater, the light module, light controller, or a combination thereof.

14. The method of claim 1, wherein the communication sequence indicates that the heater is not broken and is being turned off.

15. A light system comprising:
 a. a light module,
 b. a heater configured to heat the light module so that when ice, snow, or both are located on the light module the heater melts the snow and ice;
 c. a sensor that monitors a temperature of the light module;
 d. a switch that turns the heater on and off; and
 e. a controller that turns the switch on when snow, ice, or both are detected or an occupant of a vehicle turns the heater on, and transmits a communication to a controller of the vehicle by performing a communication sequence;
 wherein the switch reduces or cuts current to the heater during an off phase and applies all or some current to the heater during an on phase, the on and off phases forming a communication during the communication sequence, indicating that a heater is being or will be shut down.

16. The light system of claim 15, wherein the sensor monitors a temperature of the heater and upon the sensor sensing a predetermined maximum temperature provides a signal to the controller, which initiates the communication sequence which is a shutdown sequence.

17. The light system of claim 15, wherein a signal wire extends between the controller of the light system and the controller of the vehicle.

18. The light system of claim 15, wherein the light system is free of a signal wire that extends from the light system to the controller of the vehicle.

19. The light system of claim 16, wherein the shutdown sequence is a series of two or more off phases alternated with two or more on phases before a final off phase turns the heater off.

20. The light system of claim 15, wherein the communication sequence indicates that the heater is not broken and is being turned off.

* * * * *